(12) United States Patent
Ishizuka et al.

(10) Patent No.: US 12,012,719 B2
(45) Date of Patent: Jun. 18, 2024

(54) TUBULAR STRUCTURAL MEMBER FOR EXTERIOR OF CONSTRUCTION MACHINE

(71) Applicant: Caterpillar SARL, Geneva (CH)

(72) Inventors: Hidetaka Ishizuka, Akashi (JP); Kazumasa Matsumura, Akashi (JP); Naoya Okada, Akashi (JP); Takafumi Tadasu, Akashi (JP)

(73) Assignee: Caterpillar SARL, Geneva (CH)

( * ) Notice: Subject to any disclaimer, the term of this patent is extended or adjusted under 35 U.S.C. 154(b) by 476 days.

(21) Appl. No.: 17/284,384

(22) PCT Filed: Oct. 8, 2019

(86) PCT No.: PCT/EP2019/025334
§ 371 (c)(1),
(2) Date: Apr. 9, 2021

(87) PCT Pub. No.: WO2020/074122
PCT Pub. Date: Apr. 16, 2020

(65) Prior Publication Data
US 2022/0396930 A1   Dec. 15, 2022

(30) Foreign Application Priority Data
Oct. 9, 2018  (JP) .................................. 2018-190816

(51) Int. Cl.
*E02F 9/08* (2006.01)
*E02F 9/16* (2006.01)

(52) U.S. Cl.
CPC .............. *E02F 9/0833* (2013.01); *E02F 9/16* (2013.01)

(58) Field of Classification Search
CPC .................................. E02F 9/0833; E02F 9/16

USPC ........................................................... 138/172
See application file for complete search history.

(56) References Cited

U.S. PATENT DOCUMENTS

| 3,990,478 | A | * | 11/1976 | McFarland | F16L 58/04 |
| | | | | | 138/DIG. 6 |
| 4,296,921 | A | * | 10/1981 | Hayashi | C21C 5/4613 |
| | | | | | 138/140 |
| 4,647,255 | A | * | 3/1987 | Pow | B21D 9/03 |
| | | | | | 72/369 |
| 4,684,155 | A | * | 8/1987 | Davis | B65G 53/523 |
| | | | | | 138/DIG. 6 |

(Continued)

FOREIGN PATENT DOCUMENTS

| CN | 101484722 | 7/2009 |
| CN | 105917050 | 8/2016 |

(Continued)

OTHER PUBLICATIONS

International Search Report related to Application No. PCT/EP2019/025334; reported on Jan. 17, 2020.

*Primary Examiner* — David R Deal

(57) ABSTRACT

To provide a pipe member being able to reduce the vibration applied and improve its durability. A pipe member to be installed on the body of a construction machine has an outer main pipe and an inner auxiliary pipe inserted into the outer main pipe. An outer diameter of the inner auxiliary pipe is formed smaller than an inner diameter of the outer main pipe. The inner auxiliary pipe has a securing part secured on the outer main pipe and at least one of end parts of the inner auxiliary pipe is a free end without being secured on the outer main pipe.

8 Claims, 3 Drawing Sheets

(56) References Cited

U.S. PATENT DOCUMENTS

| | | | | |
|---|---|---|---|---|
| 4,700,751 | A * | 10/1987 | Fedrick | F16L 59/06 138/104 |
| 5,255,487 | A * | 10/1993 | Wieting | B60J 5/0444 428/683 |
| 5,755,265 | A * | 5/1998 | Stouten | F16L 59/20 138/155 |
| 11,447,087 | B2 * | 9/2022 | Lee | B60R 21/131 |
| 2014/0373947 | A1 | 12/2014 | Hong et al. | |
| 2016/0326717 | A1 * | 11/2016 | Park | B60N 3/02 |

FOREIGN PATENT DOCUMENTS

| | | |
|---|---|---|
| EP | 3095923 A1 | 11/2016 |
| JP | 1977163825 | 12/1977 |
| JP | 1996277546 | 10/1996 |
| JP | 1997125459 | 5/1997 |
| JP | 2002061231 A | 2/2002 |
| JP | 2002088817 | 3/2002 |
| JP | 2003119825 A | 4/2003 |
| JP | 2010236285 A | 10/2010 |
| JP | 2012036629 A | 2/2012 |
| JP | 2016135975 | 7/2016 |

* cited by examiner

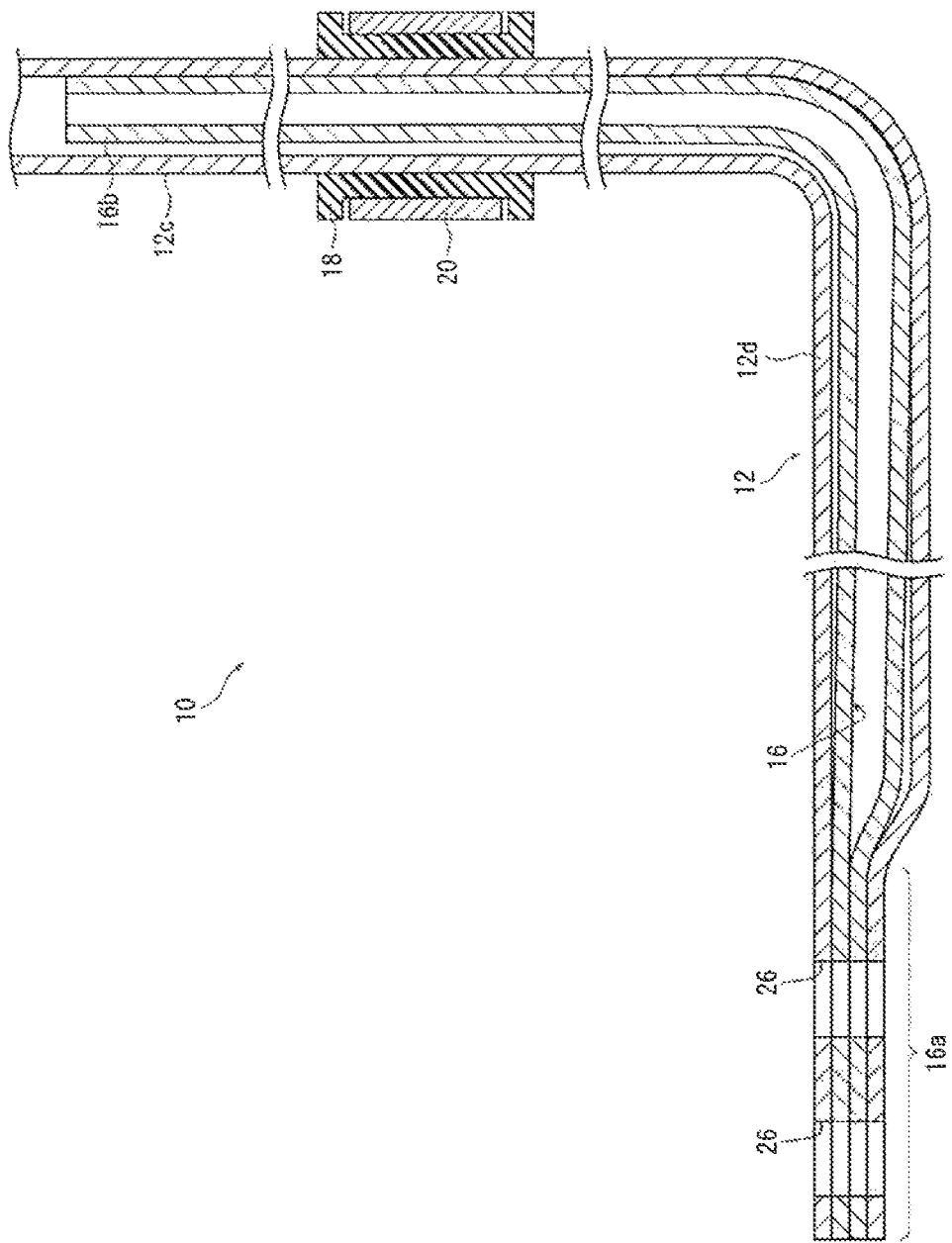

TUBULAR STRUCTURAL MEMBER FOR EXTERIOR OF CONSTRUCTION MACHINE

CROSS-REFERENCE TO RELATED APPLICATION

This Application is a 35 USC § 371 US National Stage filing of International Application No. PCT/EP2019/025334 filed on Oct. 8, 2019 which claims priority under the Paris Convention to Japanese Patent Application No. 2018-190816 filed on Oct. 9, 2018.

FIELD OF THE INVENTION

The present invention relates to a pipe member installed on the body of construction machines.

BACKGROUND ART

In general, construction machines such as a hydraulic excavator and bulldozer have a maintenance deck at the top of the body, a handrail member is installed along the lifting step for an operator to go up to and down from the maintenance deck, and a fence member is installed at an end part of the maintenance deck for avoiding falling off. Many of the handrail members and fence members are made of pipe members and both end parts of the pipe members processed such as bent to an appropriate shape are fixed on the body of construction machines.

The pipe member fixed on the body of the construction machine may vibrate a lot because of a vibration during some travel and others of the construction machine and the pipe member may break because a stress due to the vibration is concentrated on the fixed section of the pipe member. Also, the pipe member to be installed on the construction machine may be used not only as the handrail member and fence member but also as a support member, and similar to mentioned above, the pipe member used as the support member may break due to the vibration.

In order to solve this problem, Patent Document 1 below discloses the handrail member, wherein granulated materials are filled in a space defined by a wall surface vibrating along with the vibration of the handrail member body. Then, this handrail member can reduce vibration amplitude of the handrail member caused by a resonant frequency through the damping effect that a vibration energy is consumed by a friction between the wall surface defining the space in which granular materials are filled and granular materials. Thus, the stress acting on the fixed section between the handrail member and body is reduced, so the breakage of the fixed section is avoided.

CITATION LIST

Patent Document

PTL 1: Japanese Unexamined Patent Application Publication No. 2012-36629

SUMMARY OF INVENTION

Problem to be Solved by the Invention

However, with regard to the handrail member disclosed in the Patent Document 1 mentioned above, there may be a problem that it is necessary to form a space partitioned by a party wall in an inside of the pipe member and fill granular materials in the space and it takes a lot of cost and time for the processing.

In consideration of what mentioned above, a task of the present invention is to provide a pipe member simply configured for allowing to reduce the vibration applied and improve its durability.

Means for Solving the Problem

In order to solve the task above, this invention provides a following pipe member. That is to say, a pipe member to be installed on the body of construction machine comprising: and an outer main pipe; an inner auxiliary pipe inserted into an inside of the outer main pipe; wherein an outer diameter of the inner auxiliary pipe is formed smaller than an inner diameter of the outer main pipe; and wherein the inner auxiliary pipe has a securing part secured on the outer main pipe and at least one of the end parts of the inner auxiliary pipe is a free end without being secured on the outer main pipe.

A part of outer peripheral surface on the free end side of the inner auxiliary pipe comes preferably into contact with an inner peripheral surface on the outer main pipe. An axial length of not-secured part extending from the securing part to the free end of the inner auxiliary pipe shall be suitably twice or more as much as the external diameter of the inner auxiliary pipe. The outer main pipe shall have a straight part extending straight from the securing part toward axial direction on one side, and the axial length of not-secured part extending from the securing part to the free end of the inner auxiliary pipe shall be conveniently half or more as much as the axial length of the straight part. The outer main pipe shall have at least two fixed parts to be fixed on the body of construction machine on one end part side and the inner auxiliary pipe shall preferably extend from the fixed part near the one end part of the outer main pipe and extend beyond the fixed part far from the one end part of the outer main pipe. The outer main pipe and the inner auxiliary pipe shall be suitably secured at the securing part by a plastic deformation processing or welding process or by securing with bolts or rivets. The pipe member according to this invention shall be conveniently installed on the construction machine as the handrail member, fence member, or support member supporting a mirror or antenna. The inner auxiliary pipe shall preferably include first inner auxiliary pipe inserted into one end part of the outer main pipe and second inner auxiliary pipe inserted into other end part of the outer main pipe.

Effects of the Invention

In the pipe member according to an embodiment of this invention, since the inner auxiliary pipe has a securing part secured on outer main pipe and at least one of end parts of the inner auxiliary pipe is a free end without being secured on the outer main pipe, the inner auxiliary pipe vibrates in a different frequency from that of the outer main pipe when a vibration is applied. So, outer peripheral surface on the inner auxiliary pipe and inner peripheral surface on the outer main pipe rub with each other so that the vibration energy is consumed by a friction between the outer peripheral surface on the inner auxiliary pipe and the inner peripheral surface on the outer main pipe. Therefore, the pipe member according to this invention can reduce the vibration applied and improve durability.

Also, since the pipe member according to this invention may comprise an outer main pipe and an inner auxiliary pipe whose outer diameter is smaller than inner diameter of the outer main pipe, the pipe member has simpler configuration than that of the handrail member disclosed in Patent Document 1 above.

BRIEF DESCRIPTION OF THE DRAWINGS

FIG. 3 is a cross sectional view at section B in FIG. 1.

DESCRIPTION OF EMBODIMENT

Now, an embodiment of the pipe member according to this invention will be described with reference to the drawings.

Figure 1:
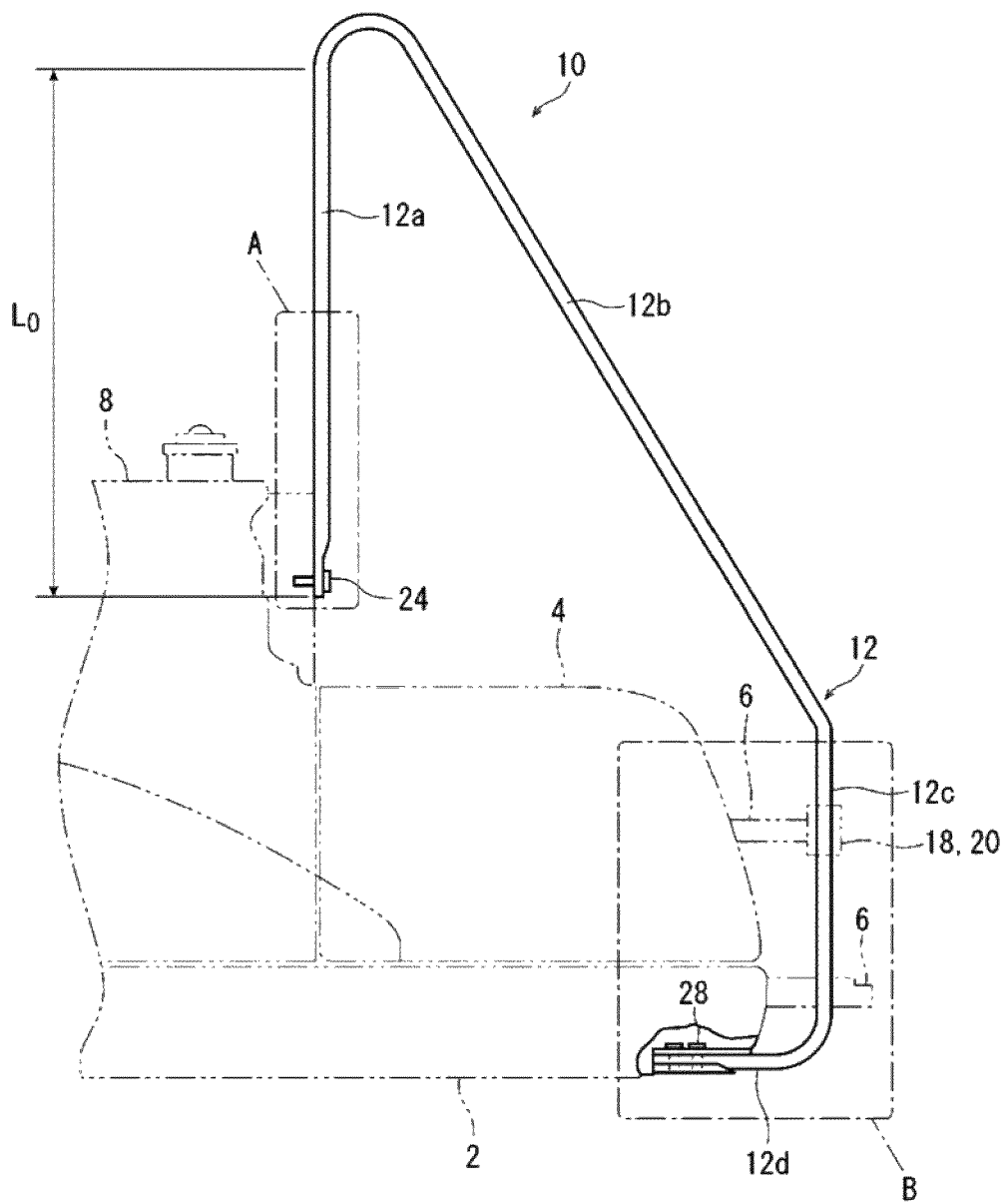
FIG. 1 is a front view of the pipe member configured according to this invention.

Referring to FIG. 1 for illustration, a body 2 (upper swiveling body of a hydraulic excavator, for example) of a construction machine according to the embodiment shown is installed with a storage box 4 disposed at a front of the body 2, a pair of lifting steps 6 protruding forward from a front of the storage box 4, and a fuel tank 8 disposed at a back of the storage box 4. A maintenance deck (not shown) is installed at a top of the body 2, and an operator can move to the maintenance deck via the lifting step 6, a top surface on the storage box 4, and a top surface on the fuel tank 8.

The pipe member 10 is installed on the body 2 as a handrail member for holding when the operator is going up to and down from the maintenance deck. The pipe member 10 has the outer main pipe 12 extending from a top of the fuel tank 8 to an under-surface on the body 2, first inner auxiliary pipe 14 (refer to FIG. 2) inserted into one end part of the outer main pipe 12, and second inner auxiliary pipe 16 (refer to FIG. 3) inserted into other end part of the outer main pipe 12. The outer main pipe 12, first inner auxiliary pipe 14, and second inner auxiliary pipe 16 may be made of appropriate cylindrical metallic material including a steel pipe.

The outer main pipe 12 has a first part 12a extending upward from the top of the fuel tank 8, a second part 12b extending downward-slantly forward from a top end of the first part 12a, a third part 12c extending downward from a front edge (bottom end) of the second part 12b, and a fourth part 12d extending backward from a bottom end of the third part 12c. As understood by referring to FIGS. 1, 3, the third part 12c of the outer main pipe 12 is fixed on the body 2 via elastic cylindrical grommet 18 and metallic cylindrical clamping member 20. Note that the clamping member 20 is connected with upper lifting step 6.

An outer diameter of the first and second inner auxiliary pipes 14, 16 according to the embodiment shown is smaller than an inner diameter of the outer main pipe 12 and an axial length of the first and second inner auxiliary pipes 14, 16 is shorter than that of the outer main pipe 12. In addition, one inner auxiliary pipe having the same axial length as that of the outer main pipe 12 may be inserted into the outer main pipe 12.

Figure 2:
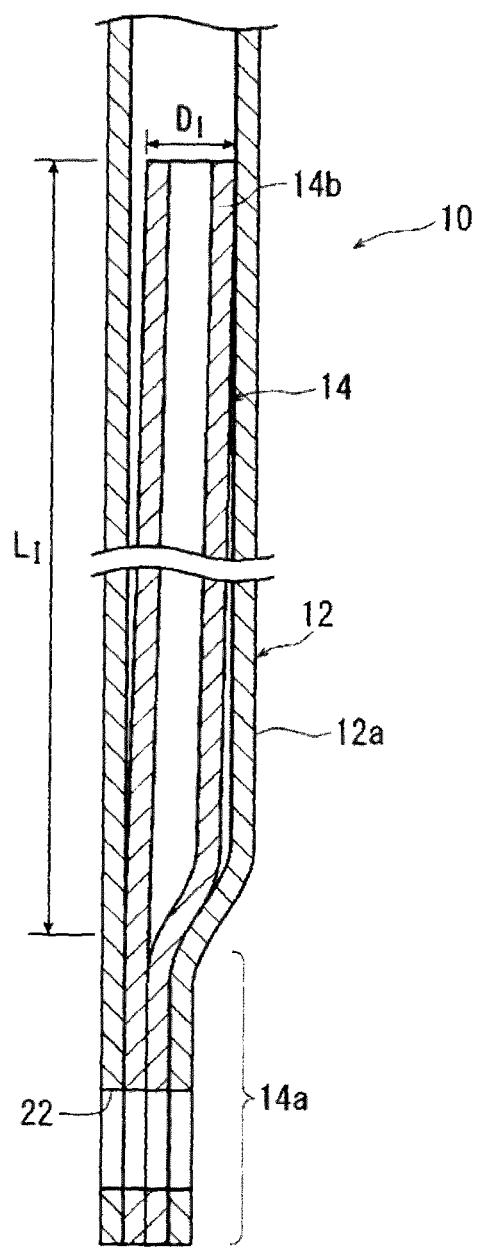
FIG. 2 is a cross sectional view at section A in FIG. 1.

Referring to FIGS. 1 and 2 for illustration, one end part 14a of the first inner auxiliary pipe 14 as well as a bottom part of the first part 12a of the outer main pipe 12 are plastically deformed to a flat oval shape by a pressing process, and thus, the one end part 14a is secured on the outer main pipe 12 as a securing part. A bolt hole 22 is formed at the one end part 14a of the first inner auxiliary pipe 14 as a plastically deformed securing part and the bottom part of the first part 12a of the outer main pipe 12. Also, one end part of the pipe member 10 is fixed at the top of the fuel tank 8 by using a bolt 24 passing through the bolt hole 22.

Meanwhile, other end part 14b of the first inner auxiliary pipe 14 is a free end without being secured on the outer main pipe 12. A part of outer peripheral surface on the free end side (the other end part 14b side) of the first inner auxiliary pipe 14 shall come preferably into contact with the inner peripheral surface on the outer main pipe 12. In the embodiment illustrated in the figure, as the one end part 14a of the first inner auxiliary pipe 14 and the bottom part of the first part 12a of the outer main pipe 12 are press processed from right to left side of FIG. 2, the other end part 14b of the first inner auxiliary pipe 14 slants to a right side of FIG. 2 so that the outer peripheral surface on the first inner auxiliary pipe 14 on the right side in FIG. 2 comes into contact with the inner peripheral surface on the outer main pipe 12.

Referring to FIG. 2 for illustration, the axial length LI of not-secured part from the securing part to the free end of the first inner auxiliary pipe 14 shall be suitably twice or more as much as the outer diameter DI of the first inner auxiliary pipe 14 (LI>2DI). In the embodiment illustrated in the figure, the axial length LI of not-secured part of the first inner auxiliary pipe 14 is half or more as much as axial length LO of first part 12a extending straight of the outer main pipe 12 (LI>(LO/2)).

Referring to FIGS. 1 and 3 for illustration, one end part 16a of second inner auxiliary pipe 16 as well as a back end part of fourth part 12d of the outer main pipe 12 are plastically deformed to a flat oval shape by the pressing process, and thus, the one end part 16a is secured on the outer main pipe 12 as a securing part. A pair of bolt holes 26 are formed at the one end part 16a of the second inner auxiliary pipe 16 and the back end part of the fourth part 12d of the outer main pipe 12. Also, other end part of the pipe member 10 is fixed at an under-surface on the body 2 by using a bolt 28 passing through the bolt holes 26. In this manner, the pipe member 10 according to the embodiment illustrated has two fixed parts at the other end side: the fixed part with the bolt 28 and the fixed part with the grommet 18 and clamping member 20.

Similar to the first inner auxiliary pipe 14, other end part 16b of the second inner auxiliary pipe 16 is a free end without being secured on the outer main pipe 12. A part of outer peripheral surface on the free end side (other end part 16b side) of the second inner auxiliary pipe 16 shall come preferably into contact with the inner peripheral surface on the outer main pipe 12. In the embodiment illustrated in the figure, the one end part 16a of the second inner auxiliary pipe 16 and the back end part of the fourth part 12d of the outer main pipe 12 are press processed from below to above in FIG. 3 and the outer main pipe 12 is bent processed between the third part 12c and fourth part 12d while the second inner auxiliary pipe 16 is inserted into the outer main pipe 12. Thus, the outer peripheral surface on the second auxiliary pipe 16 on the bottom in FIG. 3 comes into contact with inner peripheral surface on the fourth part 12d of the outer main pipe 12 and the outer peripheral surface on the second auxiliary pipe 16 on the right in FIG. 3 comes into contact with inner peripheral surface on the third part 12c of the outer main pipe 12.

As shown in FIG. 3, the second inner auxiliary pipe 16 extends from the securing part with the outer main pipe 12 and extends beyond the grommet 18 and clamping member 20. That is to say, the second inner auxiliary pipe 16 extends from a fixed part (fixed with the bolt 28) nearest to the one end part of the outer main pipe 12 of all fixed parts where the outer main pipe 12 is fixed on the body 2, and extends beyond a fixed part (fixed with the grommet 18 and clamping member 20) farthest from the one end part of the outer main pipe 12 of all fixed parts, where the outer main pipe 12 is fixed on the body 2.

As mentioned above, when a vibration is applied to the pipe member 10, the first inner auxiliary pipe 14 and the second inner auxiliary pipe 16 vibrate in different frequency from that of the outer main pipe 12. So, the outer peripheral surface on the free end side (other end part 14b side) of the first inner auxiliary pipe 14 rubs against the inner peripheral surface on the outer main pipe 12, and the outer peripheral surface on the free end side (other end part 16b side) of the second inner auxiliary pipe 16 rubs against the inner peripheral surface on the outer main pipe 12 so that the vibration energy is consumed by a friction between the outer peripheral surfaces on the first and second inner auxiliary pipes 14, 16 and the inner peripheral surface on the outer main pipe 12. Therefore, the pipe member 10 can reduce the vibration applied and improve the durability.

If the pipe member 10 has either first or second inner auxiliary pipe 14 or 16, the pipe member can cause the effect mentioned above; as shown in the illustrated embodiment, having both first and second inner auxiliary pipes 14 and 16 is preferable because the vibration can be reduced more.

Also, since the pipe member 10 may comprise the outer main pipe 12 and the first and second inner auxiliary pipes 14, 16 whose outer diameter is smaller than inner diameter of the outer main pipe and whose axial length is shorter than the axial length of the outer main pipe 12, the pipe member 10 has simpler configuration than that of the handrail member disclosed in Patent Document 1 mentioned above.

As shown in the illustrated embodiment, before the vibration is applied to the pipe member 10, when each part of outer peripheral surfaces on the first and second inner auxiliary pipes 14, 16 comes into contact with the inner peripheral surface on the outer main pipe 12 and when the vibration is applied to the pipe member 10, each outer peripheral surface on the first and second inner auxiliary pipes 14, 16 rub relatively widely against the inner peripheral surface on the outer main pipe 12, thereby consuming the vibration energy effectively.

Also, when the axial length LI of not-secured part of the first inner auxiliary pipe 14 is twice or more as much as the outer diameter DI of the first inner auxiliary pipe 14 and when the vibration is applied to the pipe member 10, amplitude of the first inner auxiliary pipe 14 increases so that the outer peripheral surface on the first inner auxiliary pipe 14 comes into contact easily with the inner peripheral surface on the outer main pipe 12 and the friction consumes a lot of vibration energy.

As shown in the illustrated embodiment, when the axial length LI of not-secured part of the first inner auxiliary pipe 14 is half or more as much as the axial length LO of a part extending straight of first part 12a of the outer main pipe 12 (LI>(LO/2)), the outer peripheral surface on the first inner auxiliary pipe 14 rubs against the inner peripheral surface on an area with relatively large amplitude of the outer main pipe 12 so that the vibration energy is consumed a lot by the friction and the vibration applied to the pipe member 10 can be effectively suppressed.

Furthermore, as shown in the illustrated embodiment, when the outer main pipe 12 has two fixed parts on the body 2 on one end part side and when the second inner auxiliary pipe 16 extends from the fixed part (fixed with the bolt 28) near the one end part of the outer main pipe 12 and extends beyond the fixed part (fixed with the grommet 18 and clamping member 20) far from the one end part of the outer main pipe 12, the inner peripheral surface on the second inner auxiliary pipe 16 rubs against the outer peripheral surface not only on an area with relatively small amplitude but also on an area with relatively large amplitude of the outer main pipe 12, so that the vibration applied to the pipe member 10 can be effectively suppressed.

In addition, with respect to a securing between the outer main pipe 12 and the inner auxiliary pipe in the embodiment illustrated in the figure, although the example is secured by a pressing process, they may be secured by a bending process or welding process, or by using bolts or rivets. For example, it may be possible to insert the inner auxiliary pipe extending from a middle part of the first part 12a of the outer main pipe 12 to a middle part of the second part 12b into an inside of the outer main pipe 12 and secure the outer main pipe 12 to the inner auxiliary pipe by a bending process applied to form a bent part between the first part 12a and second part 12b. In this case, the middle part of inner auxiliary pipe to which the bending process is applied is secured and both end parts of the inner auxiliary pipe as the free ends rub against the inner peripheral surface on the outer main pipe 12.

Also, in the embodiment illustrated in the figure, the example is described that the pipe member 10 as the handrail member is installed on the body 2 of construction machine, the pipe member to be configured according to the embodiment of this invention may be installed on the body 2 as a fence member or support member supporting the mirror or antenna.

The invention claimed is:

1. A pipe member to be installed on a body of a construction machine, comprising:
   an outer main pipe; and an inner auxiliary pipe entirely inserted into the outer main pipe;
   wherein an outer diameter of the inner auxiliary pipe is formed smaller than an inner diameter of the outer main pipe; and
   wherein the inner auxiliary pipe has a securing part secured on the outer main pipe and at least one end part of the inner auxiliary pipe is a free end without being secured on the outer main pipe, and an axial length of a non-secured portion of the inner auxiliary pipe extends from the securing part to the free end is configured to be a length that allows the inner auxiliary pipe to vibrate at a frequency different from that of the outer main pipe when vibration is applied to the pipe member.

2. The pipe member of claim 1, wherein a part of outer peripheral surface on the free end side of the inner auxiliary pipe comes into contact with an inner peripheral surface on the outer main pipe.

3. The pipe member of claim 1, wherein an axial length of not-secured part extending from the securing part to the free end of the inner auxiliary pipe is twice or more as much as outer diameter of the inner auxiliary pipe.

4. The pipe member of claim 1, wherein the outer main pipe has a straight part extending straight from the securing part toward an axial direction on one side; and
   wherein the axial length of not-secured part extending from the securing part to the free end of the inner auxiliary pipe is half or more as much as axial length of the straight part.

5. The pipe member of claim 1, wherein the outer main pipe has two fixed parts to be fixed on the body of the construction machine; and wherein the inner auxiliary pipe extends from a first fixed part of the at least two fixed parts of the outer main pipe and extends perpendicularly to a second fixed part of the at least two fixed parts of the outer main pipe.

6. The pipe member of claim 1, wherein the outer main pipe and the inner auxiliary pipe are secured at the securing part by plastic deformation processing or welding processing or by securing with bolts or rivets.

7. The pipe member of claim 1, wherein the pipe member is installed on the construction machine as a handrail member, fence member, or support member supporting a mirror or antenna.

8. The pipe member of claim 1, wherein the inner auxiliary pipe includes first inner auxiliary pipe inserted into one end part of the outer main pipe and second inner auxiliary pipe inserted into other end part of the outer main pipe.

* * * * *